(12) United States Patent
 Olson

(10) Patent No.: US 8,464,143 B2
(45) Date of Patent: Jun. 11, 2013

(54) ERROR DETECTION METHOD

(75) Inventor: Eric J. Olson, Reno, NV (US)

(73) Assignee: Board of Regents of the Nevada System of Higher Education, Reno, NV (US)

( * ) Notice: Subject to any disclaimer, the term of this patent is extended or adjusted under 35 U.S.C. 154(b) by 594 days.

(21) Appl. No.: 12/657,025

(22) Filed: Jan. 12, 2010

(65) Prior Publication Data

US 2011/0231742 A1 Sep. 22, 2011

Related U.S. Application Data

(60) Provisional application No. 61/204,868, filed on Jan. 12, 2009.

(51) Int. Cl.
*H03M 13/00* (2006.01)
(52) U.S. Cl.
USPC .......................................................... 714/799
(58) Field of Classification Search
USPC .......................................................... 714/799
See application file for complete search history.

(56) References Cited

U.S. PATENT DOCUMENTS

| | | | | |
|---|---|---|---|---|
| 4,168,796 A | * | 9/1979 | Fulks et al. | 714/734 |
| 4,194,113 A | * | 3/1980 | Fulks et al. | 714/732 |
| 4,732,238 A | * | 3/1988 | Baumgartner | 187/317 |
| 5,499,370 A | * | 3/1996 | Hosaka et al. | 718/102 |
| 5,701,481 A | * | 12/1997 | Hosaka et al. | 718/106 |
| 6,850,920 B2 | * | 2/2005 | Vetter | 706/11 |
| 7,085,980 B2 | * | 8/2006 | Martin-de-Nicolas et al. | 714/736 |
| 7,293,203 B1 | * | 11/2007 | Coatney et al. | 714/42 |
| 7,313,717 B2 | * | 12/2007 | Vecoven et al. | 714/4.2 |
| 7,698,609 B2 | * | 4/2010 | Lalla et al. | 714/724 |
| 2008/0282062 A1 | * | 11/2008 | Montvelishsky et al. | 712/20 |
| 2011/0231742 A1 | * | 9/2011 | Olson | 714/799 |

OTHER PUBLICATIONS

Olson et al., Determining Modes for Continuous Data Assimilation in 2D Turbulence, J. Statistical Physics, 113 (5-6), 799-840 (2003).
Olson et al., Determining Modes and Grashof Number in 2D Turbulence: a Numerical Case Study, Theoretical and Computational Fluid Dynamics, 22(5), 327-339 (2008).
Henshaw et al., On the Smallest Scale for the Incompressible Navier-Stokes Equations, Theoretical and Computational Fluid Dynamics, 1(2), 66-95 (1989).
Chris Brady, Memtest86, http://www.memtest 86.com/.
FOG, Optimization Manuals, http://www.agner.org/optimize/.

(Continued)

*Primary Examiner* — Amine Riad
(74) *Attorney, Agent, or Firm* — Wood, Herron & Evans, LLP

(57) ABSTRACT

An apparatus, program product, and method that run an algorithm on a hardware based processor, generate a hardware error as a result of running the algorithm, generate an algorithm output for the algorithm, compare the algorithm output to another output for the algorithm, and detect the hardware error from the comparison. The algorithm is designed to cause the hardware based processor to heat to a degree that increases the likelihood of hardware errors to manifest, and the hardware error is observable in the algorithm output. As such, electronic components may be sufficiently heated and/ or sufficiently stressed to create better conditions for generating hardware errors, and the output of the algorithm may be compared at the end of the run to detect a hardware error that occurred anywhere during the run that may otherwise not be detected by traditional methodologies (e.g., due to cooling, insufficient heat and/or stress, etc.).

35 Claims, 2 Drawing Sheets

OTHER PUBLICATIONS

Frigo et al., FFTW: Fastest Fourest Transform in the West, http://www.fftw.org/, Nov. 13, 2007.

Govindavajhala et al., Using Memory Errors to Attack a Virtual Machine, http://www.cs.princeton.edu/~appel/papers/memerr.pdf, preprint, 2003.

Jones, Netperf, http://www.netperf.org/netperf/NetperfPage.html.

Lumsdaine et al., LAM/MPI Parallel Computing, Indiana University, http://www.lam-mpi.org/.

Olson, Email: Athlon doesn't like Athlon Optimization, Linux-Kernel Archive, http://www.uwsg.iu.edu/hypermail/linux/kernel/0109.0/0241.html.

Peterson, Using Heat Gun to Cause ECC Memory Errors, Linux EDAC project, http://bluesmoke.sourceforge.net/heat_gun.html, Jun. 2005.

Redelmeier, CPUBurn, http://pages.sbcglobal.net/redelm/, Jun. 2001.

* cited by examiner

ERROR DETECTION METHOD

Cross-reference to Related Applications

This application claims the benefit of U.S. Provisional Application No. 61/204,868, filed Jan. 12, 2009, which is hereby incorporated by reference herein in its entirety.

GOVERNMENT FUNDING

This invention was made with support under Grant Number DMS-9902360, awarded by the U.S. Department of Energy; the United States federal government, therefore, has certain rights in the invention.

COMPUTER PROGRAM LISTING APPENDIX

The present disclosure includes, and incorporates by reference, a computer program listing appendix submitted on compact disc (along with an identical duplicate copy on a second compact disc). The computer program listing appendix includes the following files:

| File Name | Size | Date of Creation |
|---|---|---|
| Docheck | 221 | Dec. 21, 2009 |
| Doreport | 572 | Dec. 21, 2009 |
| Dotest | 549 | Dec. 21, 2009 |
| README | 1,828 | Dec. 21, 2009 |
| Makefile | 149 | Dec. 21, 2009 |
| ns2d.cfg | 175 | Dec. 21, 2009 |
| adamsv.c | 9,728 | Dec. 21, 2009 |
| alias.c | 720 | Dec. 21, 2009 |
| assim.c | 1,910 | Dec. 21, 2009 |
| bothout.c | 1,252 | Dec. 21, 2009 |
| countm.c | 2,428 | Dec. 21, 2009 |
| cutout.c | 3,130 | Dec. 21, 2009 |
| fileout.c | 2,777 | Dec. 21, 2009 |
| finst.c | 2,582 | Dec. 21, 2009 |
| fiteng.c | 5,195 | Dec. 21, 2009 |
| force.c | 9,940 | Dec. 21, 2009 |
| forcelm.c | 1,986 | Dec. 21, 2009 |
| header.h | 621 | Dec. 21, 2009 |
| lamda.c | 2,297 | Dec. 21, 2009 |
| macros.h | 1,497 | Dec. 21, 2009 |
| Makefile | 4,463 | Dec. 21, 2009 |
| mik2vor.c | 3,679 | Dec. 21, 2009 |
| mkforce.ma | 2,029 | Dec. 21, 2009 |
| Mkserial | 347 | Dec. 21, 2009 |
| normal.c | 1,186 | Dec. 21, 2009 |
| ns2d.c | 3,505 | Dec. 21, 2009 |
| nsflip.c | 7,779 | Dec. 21, 2009 |
| nsgetip.c | 730 | Dec. 21, 2009 |
| nsinit.c | 7,778 | Dec. 21, 2009 |
| nspec.c | 7,016 | Dec. 21, 2009 |
| Nsplot | 287 | Dec. 21, 2009 |
| nsrand.c | 13,998 | Dec. 21, 2009 |
| nsreyn.c | 1,986 | Dec. 21, 2009 |
| nsthrd.c | 2,119 | Dec. 21, 2009 |
| nswise.c | 2,945 | Dec. 21, 2009 |
| nswrite.c | 400 | Dec. 21, 2009 |
| plotcfl.c | 14,765 | Dec. 21, 2009 |
| ploteng.c | 10,249 | Dec. 21, 2009 |
| plotinst.c | 2,316 | Dec. 21, 2009 |
| plotjol.c | 12,293 | Dec. 21, 2009 |
| plotrec.c | 14,095 | Dec. 21, 2009 |
| proto.h | 1,696 | Dec. 21, 2009 |
| README | 10,723 | Dec. 21, 2009 |
| rndfrc.c | 19,761 | Dec. 21, 2009 |
| rwrite.c | 2,263 | Dec. 21, 2009 |
| serial.c | 423 | Dec. 21, 2009 |
| sockin.c | 3,296 | Dec. 21, 2009 |
| sockout.c | 3,464 | Dec. 21, 2009 |
| spdiff.c | 9,739 | Dec. 21, 2009 |
| Spplot | 218 | Dec. 21, 2009 |
| tmstat.c | 1,306 | Dec. 21, 2009 |
| util.c | 3,312 | Dec. 21, 2009 |
| Makefile | 1,073 | Dec. 21, 2009 |
| mpi2d.c | 3,875 | Dec. 21, 2009 |
| mpiforce.c | 3,135 | Dec. 21, 2009 |
| mpihead.h | 147 | Dec. 21, 2009 |
| mpiout.c | 2,066 | Dec. 21, 2009 |

FIELD OF THE INVENTION

The present disclosure relates, generally, to testing electronic components, such as computer components for errors. More specifically, the present disclosure relates to testing electronic components for hardware errors.

BACKGROUND OF THE INVENTION

Most of the time a personal computer sits idle. However, with the advent of multimedia and realistic physics in games, the home use of computers is becoming more computationally intensive. With computationally intensive use, intermittent errors may occur more frequently. As hardware and software become more complicated intermittent hardware errors may become more difficult to diagnose.

In particular, faulty hardware is generally viewed as an annoyance: the computer crashes because of a few bits flipped randomly in memory. One may lose his or her work, but no intentional damage may be done. However, intermittent hardware errors may be exploited to circumvent security software. Moreover, as personal computers are used more and more for financial transactions, hardware system reliability is increasingly important.

Hardware errors, particularly intermittent hardware errors, though, can be difficult to diagnose. Memory errors typically increase with heat. For example, applying heat to computer memory may cause single-bit ECC errors. Some hardware testing methods apply a load to hardware components and look for error indications. Typically, the hardware components are stressed for a period of time and then the process checks for errors. This process may be repeated. But many such errors seem to occur during use and do not manifest themselves during traditional testing methods, especially when the electronic components cool down (e.g., due to stopping) and/or are not sufficiently stressed to cause hardware errors. Furthermore, sometimes when intermittent hardware errors are generated, these hardware errors may be quickly overwritten and go undetected.

A need therefore exists for an improved manner of detecting errors such as hardware errors in electronic components.

SUMMARY OF THE INVENTION

Embodiments of the invention address these and other problems associated with the prior art by providing an apparatus, program product, and method that run an algorithm on a hardware based processor, generate a hardware error as a result of running the algorithm, generate an algorithm output for the algorithm, compare the algorithm output to another output for the algorithm, and detect the hardware error from the comparison. The algorithm is designed to cause the hardware based processor to heat to a degree that increases the likelihood of hardware errors to manifest, and the hardware error is observable in the algorithm output. As such, electronic components may be sufficiently heated and/or sufficiently stressed to create better conditions for generating hardware errors, and the output of the algorithm may be compared at the end of the run to detect a hardware error that occurred anywhere during the run that may otherwise not be detected by traditional methodologies (e.g., due to cooling, insufficient heat and/or stress, etc.).

Indeed, certain aspects of the present disclosure are set forth in the appended claims. There are additional features and advantages of the subject matter described herein. They will become apparent as this specification proceeds. In this regard, it is to be understood that the claims represent a brief summary of varying aspects of the subject matter described herein. The various features described in this section and below for various embodiments may be used in combination or separately. Any particular embodiment need not provide all features noted above, nor solve all problems or address all issues in the prior art noted above.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

Figure 1:
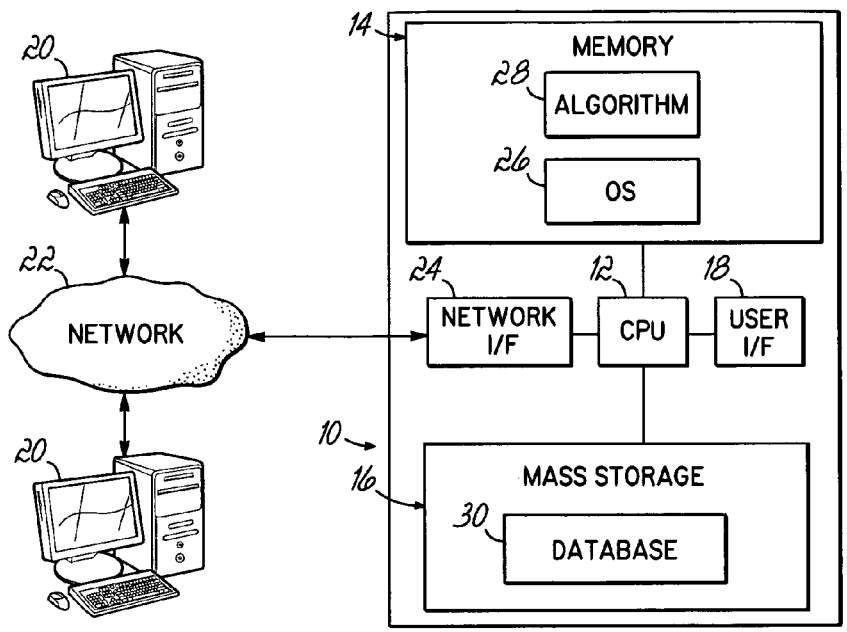
FIG. 1 is a block diagram of an apparatus including one or more electronic components and suitable for executing routines consistent with the principles of the present invention.

It should be understood that the appended drawings are not necessarily to scale, presenting a somewhat simplified representation of various preferred features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments may have been enlarged or distorted relative to others to facilitate visualization and clear understanding.

DETAILED DESCRIPTION

Unless otherwise explained, all technical and scientific terms used herein have the same meaning as commonly understood by one of ordinary skill in the art to which this disclosure belongs. In case of any such conflict, or a conflict between the present disclosure and any document referred to herein, the present specification, including explanations of terms, will control. The singular terms "a," "an," and "the" include plural referents unless context clearly indicates otherwise. Similarly, the word "or" is intended to include "and" unless the context clearly indicates otherwise. The term "comprising" means "including;" hence, "comprising A or B" means including A or B, as well as A and B together. All numerical ranges given herein include all values, including end values (unless specifically excluded) and intermediate ranges.

Although other methods and materials similar or equivalent to those described herein can be used in the practice or testing of the present disclosure, suitable methods and materials are described herein. Those of ordinary skill in the art will appreciate that the disclosed materials, methods, examples, etc. are illustrative only and not intended to be limiting.

Generally, the present disclosure relates to evaluating electronic components, particularly computer components and/or hardware components. The embodiments disclosed herein are particularly suited for diagnosing hardware errors in central processing units (CPUs), floating point units (FPUs), memory subsystems, disk drive, video card graphics processing units (GPUs), cell phone microcontrollers, hard disk controllers, and embedded processors, such as those present in navigation control, targeting systems, and medical equipment, among others. Indeed, basically any programmable electronic device with a processor and a memory, and having one or more electronic components (which may include the processor, the memory, and other electronic components) within which hardware errors may be exhibited during the execution of program instructions by the processor, may be tested for hardware errors consistent with the principles of the present invention. The present disclosure may also be adapted to test communication busses that link electronic components, and in this regard, the communication busses may themselves be considered electronic components. The present disclosure may be used as a system reliability test, testing electronic components and their interconnections. The present disclosure is not limited to use in the context of a personal computer, but may be applicable to a cell phone or any other programmable electronic device. In addition, an electronic component may itself include subcomponents that themselves are electronic components. For example, a computer, as well as the CPU and memory therein, may all be considered electronic components in some embodiments of the invention.

Hardware errors may be errors generated by electrical or magnetic noise, timing errors, errors generated by the way wires are laid on a circuit board and how the signals are traveling through the wires, etc. It is worth noting that although many hardware errors may be caused by a defective memory, a defective processor, or defective circuitry, for example, the hardware errors may also be generated as a result of incompatibility. For example, the way that memory A, processor B, and circuitry C work together may be generating the hardware error, even though each of these individually is not defective and does not generate a hardware error itself.

Embodiments consistent with the principles of the present invention may include the step of running an algorithm on a hardware based processor, with the algorithm designed to cause the hardware based processor to heat to a degree that increases the likelihood of hardware errors to manifest. Running the algorithm may include executing a computer program that causes one or more hardware components to produce heat. The heat may be used to test for errors in the heated component or in a component thermally coupled to the heated component. For example, the heat may increase the error rate of the heated component or a component thermally coupled thereto. Those of ordinary skill in the art will appreciate that heat or heat that increases the likelihood of hardware errors to manifest may depend upon the particular electronic component being tested and its threshold for heat, may depend on the level of heat that is typically utilized in art to test hardware, etc. In general, the more non-linear memory access patterns, the more complex the computations, and the quicker the memory access may be.

Suitable computer programs may have one or more relevant features. One feature is that the computer program uses an algorithm by which any errors are propagated. That is, when an error occurs, it is carried forward in the algorithm and reflected in the algorithm output of the computer program. The propagation may be referred to as "sensitivity to initial conditions" or "deterministic chaos." Another feature is that, when a hardware error occurs, the error is magnified. That is, a small initial hardware error is subsequently used in the algorithm in a way that produces a larger error in algorithm output of the algorithm of the computer program. The magnification feature may have various advantageous, such as an error being larger and easier to detect. In some implementations, the algorithm has both the features of magnification and propagation. In some implementations, even a one bit error sufficiently alters the algorithm output such that a hardware error can be detected.

A feature of the disclosed method is that the algorithm used allows errors to be determined at the conclusion of a test. Prior testing methods often stressed (e.g., memory chips) and then checked for errors. However, ceasing the hardware stress, prior to testing, may allow the hardware components to cool down from their peak stress. Thus, the test may not be testing a hardware component that is sufficiently stressed to generate errors. In the disclosed embodiments, however, the algorithm used to generate hardware stress is sensitive to errors, such as by propagating or preserving errors. Thus, the stress algorithm may be used to place hardware components under a desired degree of stress. Output of the algorithm is then compared to detect whether a hardware error occurred. For example, the algorithm output of the computer program may be examined at the end of the program run to determine whether an error occurred anywhere during the run. Thus, errors can be detected while the components are still actively being stressed.

Turning now to the drawings, wherein like numbers denote like parts throughout the several views, FIG. 1 illustrates an exemplary hardware and software environment of one or more electronic components, in the form of an apparatus 10, suitable for implementing error detection consistent with the principles of the invention. For the purposes of the invention, apparatus 10 may represent practically any type of computer, computer system, or other programmable electronic device, including a client computer, a server computer, personal computer, super computer, a portable computer, a handheld computer, an embedded controller, a cell phone, etc. Moreover, apparatus 10 may be implemented using one or more networked computers, e.g., in a cluster or other distributed computing system. Apparatus 10 will hereinafter also be referred to as a "computer," although it should be appreciated that the term "apparatus" may also include other suitable programmable electronic devices. In addition, apparatus 10 may itself be considered an electronic component, or may be considered to house one or more electronic components, depending upon the level of granularity desired in terms of error detection.

Computer 10 typically includes a central processing unit (CPU) 12 including one or more microprocessors coupled to a memory 14, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 16 or on another computer coupled to computer 10. Indeed, each CPU 12 is typically implemented in hardware (i.e., hardware based processor) using circuit logic disposed on one or more physical integrated circuit devices, or chips. Each CPU 12 may be one or more microprocessors, micro-controllers, field programmable gate arrays, or ASICs, etc. while memory 14 may include random access memory (RAM), dynamic random access memory (DRAM), static random access memory (SRAM), flash memory, and/or another digital storage medium, typically implemented using circuit logic disposed on one or more physical integrated circuit devices, or chips. The CPU 12 may also include another electronic component capable of functioning as a processor (or including a processor). For example, CPU 12 may include a graphics card such that at least a portion of the computations are run by the graphics card (e.g., in parallel). In such a case, the graphics card may function as if there were multiple processors.

Computer 10 also typically receives a number of inputs and outputs for communicating information externally. For interface with a user or operator, computer 10 typically includes a user interface 18 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a client or single-user computer 20 coupled to computer 10 over a network 22. This latter implementation may be desirable where computer 10 is implemented as a server or other form of multi-user computer. However, it should be appreciated that computer 10 may also be implemented as a standalone workstation, desktop, or other single-user computer in some embodiments.

For non-volatile storage, computer 10 typically includes one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include an interface 24 with one or more networks 22 (e.g., a LAN, a WAN, a wireless network, and/or the Internet, among others) to permit the communication of information with other computers and electronic devices. It should be appreciated that computer 10 typically includes suitable analog and/or digital interfaces between CPU 12 and each of components 14, 16, 18, and 24 as is well known in the art.

Computer 10 operates under the control of an operating system 26, and executes or otherwise relies upon various computer software applications, components, programs, objects, modules, data structures, etc. For example, an algorithm 28 for heating and/or stressing computer 10 to increase the likelihood of generating hardware errors may be resident in memory 14. Also, computer 10 may include a database 30 resident in mass storage 16. Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program (e.g., computer program or operations thereof), object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

The exemplary system illustrated in FIG. 1 is not intended to limit the present invention. Indeed, those skilled in the art will recognize that other alternative hardware and/or software environments may be used without departing from the scope of the invention. For example, an electronic component consistent with the principles of the present invention may only include a processor such as the CPU 12, a memory such as the memory 14, and connections between those items such that all of the other items discussed above may not be in that electronic component. Furthermore, the electronic component may have more than one hardware based processor and/or different functionality than that described herein may be accorded to the items consistent with the principles of the present invention.

In the context of the embodiments, a test may be generated and utilized to detect hardware errors. Specifically, an algorithm (as discussed herein) may be generated, optimized, and run on the hardware based processor (CPU 12) to compute the solution to a mathematical problem, and in computing the solution, the computer 10 is tested for hardware errors. The hardware error may be generated during the running of the algorithm because the algorithm causes the processor to heat up with the read and/or write operations into the memory 14 of computer 10. The hardware error may be propagated and/or magnified as the algorithm reads and/or writes into the memory 14. The hardware error may be generated in part because the mathematical problem that was selected may exhibit deterministic chaos and in part because of the other characteristics of the algorithm.

After the processor finishes running the algorithm, the processor may generate algorithm output for the algorithm and compares the algorithm output to another output, such as a predetermined value indicative of what the algorithm output should be for computer 10 (e.g., for the configuration of computer 10) in the absence of hardware errors. Alternatively, the processor may run the algorithm at least one other time, for example, in parallel or in series, so as to run the algorithm multiple times on computer 10 and generate multiple instances of the algorithm. The outputs of the various instances may be compared to each other. Regardless of the alternative chosen, the processor may detect a hardware error from the comparison, and may even recommend a potential solution, for example, a checklist of potential solutions to be tried (e.g., manually) such as replacing the memory 14, to correct the detected hardware error.

Of note, those of ordinary skill in the art may appreciate that embodiments consistent with the present invention may come pre-installed on an electronic component, may be available on a CD-Rom or other readable medium and utilized to test an electronic component, etc. Indeed, various other variations are within the scope of the present invention. Furthermore, those of ordinary skill in the art will appreciate that hardware errors may be generated directly or indirectly (discussed further hereinbelow), yet, they may be observable in the algorithm output. Nonetheless, the invention is not limited to the embodiments discussed herein. Indeed, one of ordinary skill in the art may appreciate that, consistent with the principles of the present invention, the CPU, FPU, cache, and memory, for example, may be loaded to exhibit intermittent hardware errors in minutes that may otherwise take days to manifest, if they manifested at all.

Figure 2:
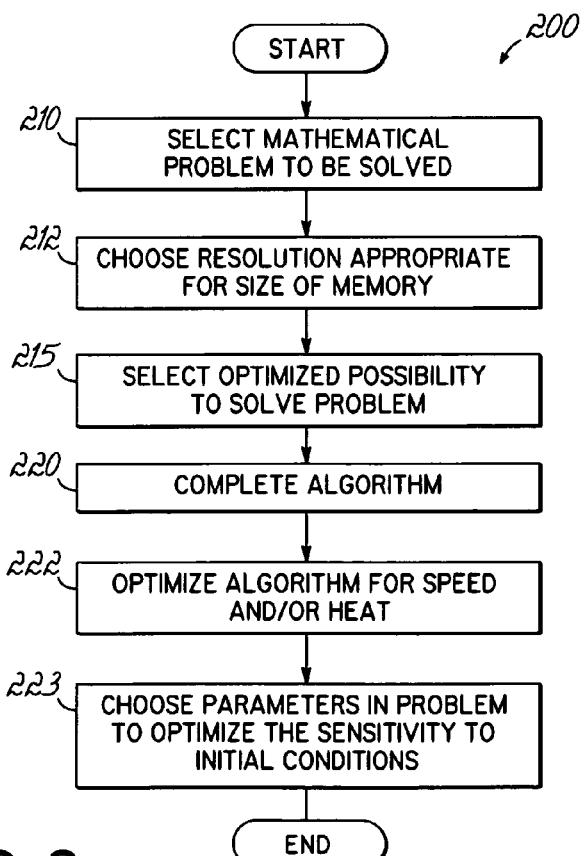
FIG. 2 is a flowchart of an exemplary routine to be executed by the hardware based processor of the electronic component of FIG. 1 for generating a hardware error detection test consistent with the principles of the present invention.

Turning now to FIG. 2, this figure illustrates an exemplary routine 200 for generating a hardware error detection test consistent with the principles of the present invention. Starting with block 210, this block selects the mathematical problem to be solved by the algorithm. The mathematical problem may be a fluid flow problem but need not be. For example, the fluid flow problem may include the Navier-Stokes equations:

$$\begin{cases} \frac{\partial u}{\partial t} + (u \cdot \nabla)u - v\Delta u + \nabla p = f \\ \nabla \cdot u = 0 \end{cases}$$

The mathematical problem may be one that exhibits deterministic chaos so that any hardware errors that are generated will be propagated and/or magnified so as to be observable in the algorithm output. The fluid flow problem tends to exhibit deterministic chaos, and as such, a small hardware error may be detected after the running of the algorithm when the hardware error is much larger. Moreover, the hardware error has not been rewritten and may be observable at the end in the algorithm output. Further, due to propagation of the error, the algorithm does not need to be stopped during the run, as stopping may cause the electronic component to cool down and not generate the hardware error. Furthermore, the mathematical problem may be one that is sufficiently complex so as to require high memory loads.

As part of block 210, various mathematical problems may be available for selection, and user input may be required during the selection process. Alternatively, a user may previously identify his or her preference as to the mathematical problem to be selected, and this preference (if available) may be selected. Lastly, until the algorithm is generated and run, the mathematical problem may contain dummy parameters, which may also be known as bifurcation parameters.

Next, block 212 chooses a resolution appropriate for the size of the memory being tested (i.e., the memory of the electronic device being tested for hardware errors). The resolution depends upon the actual or approximate actual size of the memory being tested, and the resolution may be chosen such that the size of the memory utilized by the algorithm is about the same size of the actual memory being tested. Those of ordinary skill in the art will appreciate that it may not be practical to choose a resolution that is larger than the actual memory, and the actual memory may not even be able to be tested properly if the resolution is too large. If the resolution is too small, the actual memory may also not be tested properly, but smaller portions thereof may be tested properly. It is worth noting that the resolution that is chosen in block 212 may be utilized to optimize the algorithm for speed (hereinbelow at block 222) and/or to determine the memory access patterns to be utilized (hereinbelow at blocks 215, 220).

Next, block 215 selects an optimized possibility (e.g., possibility may be a transform or the like) for solving the mathematical problem. For example, an optimized Fourier transform (also called fast Fourier transform) may be selected and called by the algorithm to solve the mathematical problem. Of note, the optimized possibility that is selected may only assist with solving a portion of the mathematical problem, not the whole problem. For example, the optimized Fourier transform may be utilized to solve the non-linear term between the plus sign and the minus sign of the Navier-Stokes equations.

In some embodiments, a library of various options to perform the computations may be available, and each of these possibilities may be run, the fastest may be chosen, and that possibility will be selected in block 215. For example, MIT has Suitable code that is provided in the Computer Program Listing Appendix filed herewith for an optimized Fourier transform. The code is written in the C programming language and uses the optimized Fourier transform library of Frigo et al., *The Fastest Fourier Transform in the West*, MIT Technical Report, MIT-LCS-TR-7287 (1997) (available at http://www.fftw.org), incorporated by reference herein to the extent not inconsistent with the present disclosure.

Although the Fourier transform may be chosen, other transforms are also possible such as a cosine transform or a fast wavelet transform. Specifically, the selection in block 215 will typically indicate the order in which the basic multiplications and additions will take place during the computation. The order may change depending on the selection. And, one possibility, for example, may be fast or optimized for a particular electronic component and not another, or fast or optimized for a particular problem and not another. Thus, the selection may be optimized for the particular electronic component being tested and the particular problem to be solved (block 210). Furthermore, as in connection with block 210, an optimized possibility that exhibits deterministic chaos or similar properties to propagate and/or magnify hardware errors may be utilized.

In some embodiments, the optimized possibility selected in block 215 may be provided by the manufacturer of the electronic component being tested. For example, Intel oftentimes provides an optimized Fourier Transform for some of its components, including graphic cards. Further, it is worth noting that the Fourier transform may be advantageous over other possibilities because there are highly optimized Fourier transform codes written for many electronic components, even for graphics cards, and thus, optimized Fourier transforms may be readily available. As other alternatives, subroutine libraries may be utilized to compute the optimized possibility to be selected, or the possibility to be selected may be downloaded (with payment of a fee), and/or sometimes the possibilities are built into the hardware. Moreover, one can write and run a routine to access memory in certain ways, e.g., non-linear ways. Nonetheless, those of ordinary skill in the art may appreciate that the selected possibility may be optimized to run fast, as a slower run may not be designed to cause sufficient heat, may not access memory as quickly, may not access memory in a non-linear pattern, etc., and may thus not generate hardware errors.

Of note, in some embodiments, block 215 may simply select a transform or the like, for example, and this transform may not be optimized. Instead, the transform may be optimized in connection with block 222 (discussed hereinbelow). For instance, at block 215, a Fourier transform may be selected as the possibility, but it may not be until block 222 that the Fourier transform is optimized for speed for the electronic component being tested by an automated search through mathematically equivalent ways of computing the desired transform to find a speed optimal transform.

Next, block 220 completes the algorithm. By block 220, the mathematical problem to be solved as well as the optimized possibility to solve the problem have been selected, and block 220 may complete any other requirements for the algorithm such as loading any remaining code to run the algorithm. For instance, completing the algorithm may include selecting other options for solving the remainder of the selected mathematical problem such as selecting the Adams-Bashforth scheme and/or the Runge-Kutta scheme for the remainder of the Navier-Stokes equations.

Completing the algorithm may also include stress and/or heating other portions of the electronic component being tested or other electronic components (e.g., coupled to the electronic component being tested). As such, hardware errors may be generated directly and/or indirectly, but nonetheless observable in the algorithm output. For example, the algorithm may load another electronic component or components (e.g., a video card, a sound card, an auxiliary floating point processor, an auxiliary vector processor, a communication bus, a graphics card, or other component) to function like a processor to run a portion of the algorithm on that electronic component, while a portion of the algorithm is running on the hardware based processor. By running computations of the algorithm on the other electronic component (e.g., related to the Fourier transform), this may cause stress and/or heat of the electronic component to a degree that increases the likelihood of hardware errors to manifest directly in that electronic component. And the direct hardware errors generated in the electronic component may then be observable in the algorithm output at the end. As an example, when the graphics card, or more specifically the processor thereof, is used in the running of the algorithm, the error may occur directly in the graphics card and detected in the algorithm output at the end. Similarly, when the sound or video card thereof, is used in the running of the algorithm, the error may occur directly in the card and detected in the algorithm output at the end.

Of note, the other electronic component may be any of those listed above as well as others depending on what is available. For example, a separate auxiliary floating point processor may not be available, instead, a combination auxiliary vector processor that is also an auxiliary floating point processor may be available. Furthermore, sometimes a sound card or video card, depending on the card, may not be able to perform computations to run a portion of the algorithm. Further, the communication bus is included in the listing even though it may not be separately loaded.

Alternatively, the algorithm may load another electronic component or components to at least one of stress or heat the electronic component to a degree that increases the likelihood of hardware errors to manifest indirectly. For example, even though the electronic component may not be running any portion of the algorithm, the act of loading on its own may cause enough stress and/or heat for hardware errors to be generated in the hardware based processor and/or memory, for example, due to a draining of the power supply, even if no errors are generated in the electronic component. And, the errors that are generated in the hardware based processor and/or memory may be observable in the algorithm output. The other electronic component may be a video card, a sound card, an auxiliary floating point processor, an auxiliary vector processor, a communication bus, a graphics card, or other.

In the indirect case, the algorithm may be designed to generate network traffic to stress and/or heat a communication bus. The network traffic may be generated by interfacing the electronic component with other electronic components such as in a distributed system such that the transmission of additional data in the distributed system may stress and/or heat the communication bus. And, the hardware errors that may be generated indirectly in the memory and/or the processor, observable in the algorithm output, by heating and/or stressing the communication bus.

In both alternatives, loading and/or running may occur at about the same time the hardware based processor is running the algorithm, but without slowing down the computation. Nonetheless, those of ordinary skill in the art will appreciate that whether directly or indirectly, both alternatives increase the likelihood of generating hardware errors.

Next, block 222 optimizes the algorithm for speed and/or heat. This block may be performed iteratively in some embodiments. For example, block 222 may iteratively resequence and run mathematically equivalent program code to change the order of the computation until a faster algorithm emerges (i.e., optimized algorithm for speed emerges). Optimizing for heat may include loading of hardware to gauge how much heat the loading generates. Those of ordinary skill in the art will appreciate that at some point, the costs of optimizing the algorithm outweigh the benefits of optimizing, and a threshold may be set based on the length of time that optimization will continue, for instance.

Next, block 223 chooses parameters for the problem selected in block 210 to optimize the sensitivity to the initial conditions. This may also be referred to herein as optimizing for time dependence turbulence. First, it is worth noting that the more sensitive the parameters, the more likely it may be that hardware errors will be propagated and/or magnified. Thus, it may be advantageous to choose parameters that will be sensitive. Block 223 may choose parameters, iteratively, in some embodiments, by selecting a range of parameters, using these parameters in the range as the initial inputs (instead of the dummy parameters), testing the parameters in the range by placing them in the mathematical problem and running the problem with the parameters, comparing the outputs of the different parameters, and selecting the parameters that are the most sensitive (e.g., where the output was the most divergent). The following choice of parameters provides for time dependence turbulence and sufficient deterministic chaos and sensitivity to initial conditions in the dynamical system for its use a diagnostic test: $\omega_0=0$, $v=0.0001$, $L=2\pi$, and g as in Table 1.

TABLE 1

Fourier modes for $g_0 = \nabla \times f_0$. Since the reality condition implies $\hat{g}_{-k} = \overline{\hat{g}_k}$ we list only half the modes here.

| k | $\hat{g}_k \times 10^{-4}$ | k | $\hat{g}_k \times 10^{-4}$ |
| --- | --- | --- | --- |
| (4, 11) | −1.68185 − 1.37884i | (10, 0) | 1.24568 + 0.999582i |
| (3, 11) | −0.501504 − 4.39707i | (11, 0) | −2.45397 − 2.1001i |
| (−11, 1) | 3.22868 + 3.57232i | (−10, 1) | −3.6533 + 4.34302i |
| (10, 1) | −0.168267 + 3.63812i | (11, 1) | 1.74878 + 0.537828i |
| (−11, 2) | 1.83238 + 4.56593i | (−10, 2) | −2.27939 + 5.32842i |
| (10, 2) | 1.08206 − 2.65437i | (11, 2) | −0.12495 − 0.439438i |
| (−11, 3) | 1.23101 + 2.32092i | (−10, 3) | 3.24541 − 2.56086i |
| (10, 3) | −4.36393 + 4.81623i | (11, 3) | −3.25672 − 2.04313i |
| (−11, 4) | 0.772188 − 2.22768i | (−10, 4) | −1.18464 + 3.6144i |
| (10, 4) | 0.352859 + 3.8498i | (11, 4) | −0.0779563 − 0.483413i |
| (−10, 5) | 2.95066 − 3.88721i | (−9, 5) | 1.43467 − 3.13185i |
| (9, 5) | −4.65628 − 0.853542i | (10, 5) | −0.678476 + 1.56749i |
| (−10, 6) | 2.14982 + 3.9452i | (−9, 6) | 0.794682 − 0.405619i |
| (−8, 6) | 0.847957 + 6.09509i | (8, 6) | 0.412921 + 1.72437i |
| (9, 6) | −0.933718 + 1.34388i | (10, 6) | −0.960698 + 1.73383i |
| (−9, 7) | 3.75659 − 1.43354i | (−8, 7) | −2.33465 − 1.91763i |
| (8, 7) | −3.07828 + 1.434i | (9, 7) | −1.4385 + 2.08662i |
| (−8, 8) | 1.57689 − 3.96814i | (−7, 8) | −0.206682 + 2.31327i |
| (−6, 8) | 0.689446 − 2.66231i | (6, 8) | −0.956604 − 2.33234i |
| (7, 8) | 2.87397 − 1.28323i | (8, 8) | 0.140247 + 0.118369i |
| (−7, 9) | 3.06962 + 1.30303i | (−6, 9) | 2.42145 − 0.448085i |
| (−5, 9) | 1.3582 − 2.86109i | (5, 9) | −3.58454 + 1.92307i |
| (6, 9) | −1.08488 − 0.661055i | (7, 9) | 2.62845 + 3.4255i |
| (−6, 10) | 0.178138 − 2.35925i | (−5, 10) | 1.83893 + 3.99093i |
| (−4, 10) | −1.30734 − 1.20256i | (−3, 10) | 3.46985 + 0.165801i |
| (−2, 10) | −4.54014 + 2.54287i | (−1, 10) | −1.81676 − 6.38674i |
| (0, 10) | 2.28551 − 4.28632i | (1, 10) | 4.89391 − 0.112915i |
| (2, 10) | −2.75146 + 0.206303i | (3, 10) | −2.18555 − 0.921325i |
| (4, 10) | 0.0705579 − 0.807738i | (5, 10) | 1.54712 − 1.76146i |
| (6, 10) | 1.97628 − 1.26563i | (−4, 11) | −4.18572 − 0.412749i |
| (−3, 11) | 4.63344 + 3.9968i | (−2, 11) | 0.161582 + 4.15786i |
| (−1, 11) | 3.03338 − 1.77921i | (0, 11) | −0.608278 − 1.09338i |
| (1, 11) | −3.64792 + 6.35805i | (2, 11) | 1.35454 − 1.92183i |

However, if the first range of parameters was not satisfactory (e.g., did not produce a threshold percentage of divergence) then another range of parameters may be selected, and so on. Block 223 may conclude routine 200 of FIG. 2, and the algorithm that was generated by routine 200 may be utilized in FIG. 3.

Figure 3:
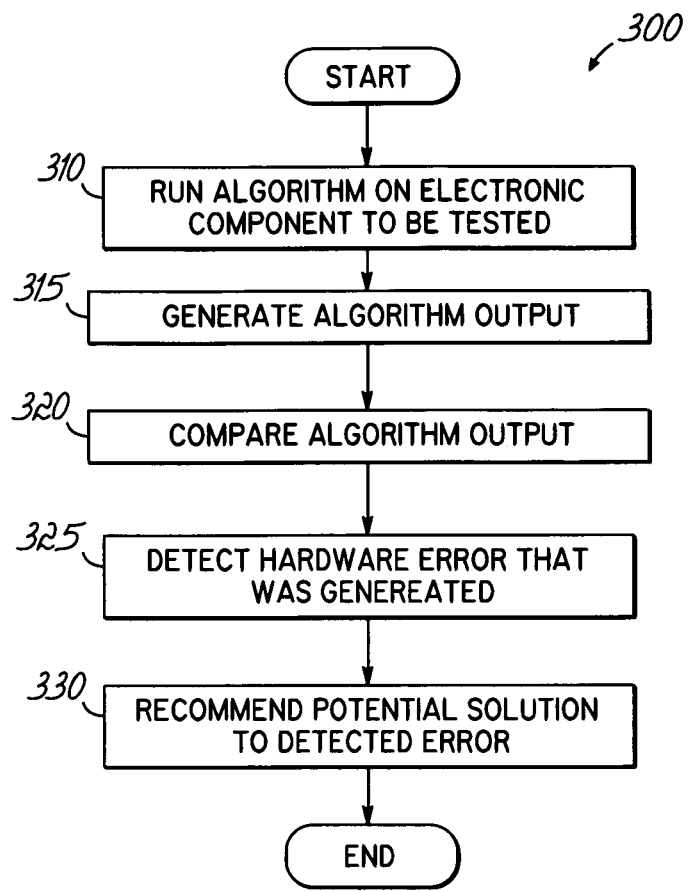
FIG. 3 is a flowchart of an exemplary routine to be executed by the hardware based processor of the electronic component of FIG. 1 for using the hardware error detection test generated in FIG. 2 consistent with the principles of the present invention.

Turning next to FIG. 3, this figure illustrates an exemplary routine 300 for using the hardware error detection test consistent with the principles of the present invention. Starting with block 310, this block runs the completed algorithm on the electronic component to be tested, including generating the heat, the stress, the propagation, the magnification, etc. that the algorithm was designed to do to increase hardware errors. Indeed, those of ordinary skill in the art will appreciate that the various factors considered and accounted for in routine 200 such as selecting a mathematical problem that exhibits deterministic chaos, selecting a transform with a non-linear memory access pattern, etc. were designed to increase hardware errors. Moreover, each of the selections of the algorithm may enhance the properties of others and multiple factors may contribute to the same property (e.g., deterministic chaos, heat generation, etc.).

It is worth noting that while the algorithm may be run on a single hardware based processor, it is contemplated that multiple processors (e.g., processors of other electronic components) may be utilized to perform part of the computations. For example, the CPU 12 may also include a graphics card, which itself has a process, and the Fourier transform may be processed by the processor of the graphics card while CPU 12 runs other parts of the algorithm. Further, the introduction of using another processor, such as the processor of the graphics card may be used to either generate additional heat and/or stress as well to speed up the computation of the algorithm. And as discussed hereinabove in connection with block 222, speeding up the computation may also generate additional heat and/or stress.

Next, block 315 generates algorithm output for the algorithm, and block 320 compares the generated algorithm output. Indeed, one way to determine whether a hardware error has occurred in algorithm output of the algorithm is to run the algorithm a plurality of times and compare the outputs from each test. Of note, the multiple instances may run in a repeatable way to ensure that the computations proceed in the same manner. Hardware errors are sometimes intermittent or unpredictable. Thus, in many cases, a hardware error will be indicated when running the algorithm provides different outputs, and detected by a comparison of the outputs. The multiple tests may be performed in series, parallel, or a combination thereof. For example, the electronic component may have multiple processors (e.g., parallel processors) and an instance of the algorithm may be running on each.

However, in some cases an error may be consistent or reproducible (e.g., same rounding errors). In such cases, the output of multiple tests may be the same, but erroneous. One way to address this issue is to compare the algorithm output from the algorithm to a reference value or predetermined value, such as the output from the algorithm running on hardware known to be error-free. Of course, these approaches of comparing multiple algorithm outputs to one another and comparing the algorithm output to a reference value may be combined in some embodiments.

Next, block 325 detects the hardware error that was generated based upon the comparison. For example, propagation and/or magnification causes a small error to become worse as the algorithm runs, such that an incorrect value in one part of memory causes many other values in memory to be incorrect. The error may be reported to a user. Additionally, block 330 may recommend a potential solution to the detected hardware error. For example, block 330 may recommend that the memory be replaced as a first potential solution. Alternatively, the recommendation may be to slow and/or cool down the electronic component better, such as by lowering the temperature of the cooling system or cooling fan. The recommendation may also be to modify the timing parameters. The solution that is recommended may be based on historical data such as data on the type of solution(s) that are most effective for the electronic component being tested or the configuration of the electronic component being tested. For example, if the electronic component has processor Y, memory Z, and circuitry H, historical data on the combination of processor Y, memory Z, and circuitry H may be automatically searched for solutions specific to that combination that have corrected and/or minimized hardware errors, and a solution or solutions may be recommended from the search results. The solution may be recommended, for example, by email. Those of ordinary skill in the art will appreciate that other recommendations are also contemplated. Block 330 may conclude routine 300.

Turning now to a more detailed discussion of the algorithm, including the various factors described hereinabove for generating the algorithm, where appropriate, reference will be made to the blocks in routines 200 (FIG. 2) and 300 (FIG. 3). In some embodiments, the algorithms are configured to employ non-linear memory access patterns. Such access patterns may aid in detecting timing related errors, such as refresh-timing related errors in a memory controller. Linear memory access patterns may mimic memory refresh cycles, and thus mask timing related errors. Fourier transforms may employ a divide and conquer memory access pattern that may be suitably non-linear.

Consistent with optimizing for heat in block 222, in some embodiments, the sequencing of algorithm operations is configured to the particular hardware being tested. For example, floating point operations can be sequenced, such as relative to memory access or integer operations, in a way that allows for maximum loading of the hardware when the algorithm is executed. Of note, floating point operations, memory access operations and/or integer operations may be sequenced. Maximizing loading may maximize the heat generated by hardware components, which may increase the chances of an error occurring and thus a potential hardware issue being diagnosed. The optimum sequencing of algorithm operations may be empirically determined for particular hardware to be tested, such as by measuring the heat generated or current drawn when a particular algorithm is executed.

Consistent with optimizing for speed in block 222, although the disclosure is not limited to any particular algorithm, it has been found that algorithms employing Fourier transforms, particularly speed optimized Fourier transforms, demonstrate the features of heat generation, error propagation, and magnification. In particular, non-linear dynamical systems computed by means of Fourier transforms or similar are typically mathematically intensive and may thus generate a suitable amount of stress and heat on hardware components, allowing errors (timing errors) to manifest themselves and propagate with magnification to the end of a calculation.

Consistent with block 210, in a particular example, the algorithm may employ fluid dynamics equations and methods for their evaluation. For example, the algorithm may include the pseudospectral simulation of the incompressible Navier-Stokes equations:

$$\begin{cases} \frac{\partial u}{\partial t} + (u \cdot \nabla)u - v\Delta u + \nabla p = f \\ \nabla \cdot u = 0 \end{cases}$$

Consistent with block 222, in a particular example, n identical numerical simulations are computed of the dynamical system where n>=3 with identical initial conditions and force to obtain states $u_i(T)$ where T>0 is fixed and $_i$=1, . . . , n. If $u_i(T) \neq u_j(T)$ for any $_i \neq _j$, then a hardware error may be indicated. The value of T may typically be chosen to be large enough that sufficient heat and system stress are generated during the test and small enough to be practically applied. When a multiple CPU or core system is being tested, the computations of $u_i(T)$ may be done in parallel with n greater than or equal to the number of hardware threads to fully load the system.

Consistent with blocks 215 and 222, suitable code is provided in the Computer Program Listing Appendix filed herewith. The code is written in the C programming language and uses the optimized Fourier transform library of Frigo et al., *The Fastest Fourier Transform in the West*, MIT Technical Report, MIT-LCS-TR-7287 (1997) (available at http://www.fftw.org), incorporated by reference herein to the extent not inconsistent with the present disclosure.

Consistent with block 220, this code uses an aliased pseudospectral simulation of the impressible Navier-Stokes equations in the vorticity form:

$$\frac{\partial \omega}{\partial t} - v\Delta\omega + (u \cdot \nabla)\omega = g$$

where $\omega = \nabla \times u$ and $g = \nabla \times f$. The code provided in the Appendix and labeled ns2d integrates the dissipative term exactly and computes the non-linear term using an aliased convolution by means of a fast Fourier transform. Specifically, in terms of its Fourier decomposition:

$$\frac{d\hat{\omega}_k}{dt} + v|k|^2 \hat{\omega}_k + ik \cdot \widehat{u\omega}_k = \hat{g}_k$$

and therefore:

$$\frac{d}{dt}\{\hat{\omega}_k \exp(v|k|^2 t)\} + ik \cdot \widehat{u\omega}_k \exp(v|k|^2 t) = \hat{g}_k \exp(v|k|^2 t).$$

Consistent with block 220, time steps are computed using a third-order Adams-Bashforth scheme that is initialized by a fourth order Runge-Kutta scheme.

Consistent with block 220, let $\hat{w}^j$ denote the Fourier transformed voracity at time $t_j = j\Delta t$. Let $$\Lambda = \text{diag}(\ldots, v(k_1^2 + k_2^2), \ldots)$$

and $$F(t, \hat{\omega}) = -ik \cdot \widehat{u\omega}_k + \hat{g}_k$$

Consistent with block 220, using these notations, the fourth order Runge-Kutta scheme used may be written:

$K_1 = F(t_j, \hat{\omega}^j)$ $K_2 = F(t_j + \Delta t/2, e^{-\Lambda\Delta t/2}(\hat{\omega}^j + K_1\Delta t/2))$ $K_3 = F(t_j + \Delta t/2, e^{-\Lambda\Delta t/2}\hat{\omega}^j + K_2\Delta t/2)$ $K_4 = F(t_j + \Delta t, e^{-\Lambda\Delta t}\hat{\omega}^j + e^{-\Lambda\Delta t/2}K_3\Delta t)$ $\hat{\omega}^{j+1} = e^{-\Lambda\Delta t}\hat{\omega}^j + (\Delta t/6)(e^{-\Lambda\Delta t}K_1 + 2e^{-\Lambda\Delta t/2}(K_2+K_3) + K_4)$ and the third order Adams-Bashforth scheme may be written:

$$\hat{w}^{j+1} = e^{-\Lambda\Delta t}\hat{w}^j + \frac{\Delta t}{12}\{23e^{-\Lambda\Delta t}F(t_j, \hat{w}^j) - 16e^{-2\Lambda\Delta t}F(t_{j-1}, \hat{w}^{j-1}) + 5e^{-3\Lambda\Delta t}F(t_{j-2}, \hat{w}^{j-2})\}$$

Memory may be allocated using standard operating system mechanisms and then rotated using machine pointers in a symmetric way in the convolution and the multistep method.

Consistent with block 223, the following choice of parameters provides for time dependence turbulence and sufficient deterministic chaos and sensitivity to initial conditions in the dynamical system for its use as a diagnostic test: $\omega_0 = 0$, $v = 0.0001$, $L = 2\pi$, and g as in Table 1 hereinabove. Additional details regarding how the choice of parameters affects sensitivity to initial conditions may be found in the following references, each of which is incorporated by reference to the extent not inconsistent with the present disclosure: Olson et al., Determining Modes for Continuous Data Assimilation in 2D Turbulence, *J. Statistical Physics*, 113(5-6), 799-840 (2003); Olson et al., Determining Modes and Grashof Number in 2D Turbulence: a Numerical Case Study, *Theoretical and Computational Fluid Dynamics*, 22(5), 327-339 (2008).

Consistent with block 223, a particular choice of parameters in the model that ensures deterministic chaos and sensitivity to initial conditions necessary for an error to be magnified and propagated to the end of the calculation is illustrated in this example. The choice of parameters is made in connection with block 223. The tuning may be done by multiple runs of the code checking for different choices of the parameters that give the greatest sensitivity to initial conditions. In this particular example, the choice of parameters may be made through a systematic exploration of the parameter space in order to maximize the numerically determining modes exhibited by the system. The determining modes are a mathematics measure of how sensitive the system is to initial conditions and the included code consists of subroutines to compute this quantity.

Consistent with block 212, the Fourier transforms used to evaluate the non-linear term are formed on a N by N spatial grid. Given the size N of the grid, $\Delta t$ is chosen to be small enough to provide that the resulting simulation is numerically stable. The value of N is chosen as the product of small primes powers in a way that is appropriate for the system memory size. For example, on a computer with 512 megabytes of main memory, N=256 is suitable. For this example, $\Delta t$=0.02 will provide for numerical stability.

Additional details regarding the fluid dynamics calculations may be found in the following references, each of which is incorporated by reference to the extent not inconsistent with the present disclosure: Case Study, *Theoretical and Computational Fluid Dynamics*, 22(5), 327-339 (2008); Henshaw et al., On the Smallest Scale for the Incompressible Navier-Stokes Equations, *Theoretical and Computational Fluid Dynamics*, 1(2), 66-95 (1989).

Consistent with routine 300 of FIG. 3, in some embodiments, testing may commence by running n copies of the numerical simulation in parallel or series depending on how many hardware CPUs are present. To allow for run-time optimization of the floating point instructions in the Fourier transform and other code paths based on machine architecture, identical runs of the numerical simulation are compared with each other for consistency rather than to a precomputed reference value. In the code provided in the Appendix, a shell script is used to start three identical copies of the program ns2d to compute the value of $u_i(T)$ and write it to the corresponding file ns2di.dat. When all copies of ns2d have finished, the algorithm output files may then be compared to verify that they are identical. If they are not, then the diagnostic halts with a hardware error.

It is to be understood that the above discussion provides a detailed description of various embodiments. The above descriptions will enable those of ordinary skill in the art to make and use the disclosed embodiments, and to make departures from the particular examples described above to provide embodiments of the methods and apparatuses constructed in accordance with the present disclosure. The embodiments are illustrative, and not intended to limit the scope of the present disclosure. The scope of the present disclosure is rather to be determined by the scope of the claims as issued and equivalents thereto. Indeed, various modifications may be made to illustrate embodiments without departing from the spirit and scope of the invention. Therefore, the invention lies in the claims hereinafter appended.

What is claimed is:

1. A method for detecting hardware errors, comprising:
    optimizing an algorithm to increase the amount of heat produced by a hardware based processor when the algorithm is run;
    running the algorithm on the hardware based processor, wherein the algorithm is designed to cause the hardware based processor to heat to a degree that increases the likelihood of hardware errors to manifest;
    generating a hardware error as a result of running the algorithm;
    generating an algorithm output for the algorithm, wherein the hardware error is observable in the algorithm output;
    comparing the algorithm output to another output for the algorithm; and
    detecting the hardware error from the comparison.

2. The method of claim 1, wherein the hardware error alters a computation of the algorithm.

3. The method of claim 1, wherein running an algorithm on a hardware based processor includes propagating the hardware error during execution of the algorithm or magnifying the hardware error during execution of the algorithm.

4. The method of claim 1, wherein comparing the algorithm output to another output for the algorithm includes comparing the algorithm output to a predetermined value for the algorithm, wherein the other output for the algorithm is the predetermined value.

5. The method of claim 1, wherein the algorithm running on the hardware based processor is a first instance of the algorithm, and wherein comparing the algorithm output to another output for the algorithm includes comparing the algorithm output of the first instance of the algorithm to algorithm output of another instance of the algorithm.

6. The method of claim 1, further comprising optimizing the algorithm to increase the speed of the hardware based processor when the algorithm is run.

7. The method of claim 1, wherein the algorithm runs in parallel over a network.

8. The method of claim 1, wherein the algorithm loads another electronic component to run a portion of the algorithm on the electronic component to at least one of stress or heat the electronic component to a degree that increases the likelihood of hardware errors to manifest directly in that electronic component, and wherein the generated hardware error is observable in the algorithm output.

9. The method of claim 1, wherein the algorithm loads another electronic component to at least one of stress or heat the electronic component to a degree that increases the likelihood of hardware errors to manifest indirectly, and wherein the generated hardware error is observable in the algorithm output.

10. The method of claim 1, further comprising recommending a potential solution to the detected hardware error, choosing a resolution appropriate for a memory associated with the hardware based processor running the algorithm, or generating the algorithm designed to cause the hardware based processor to heat to a degree that increases the likelihood of hardware errors to manifest.

11. A method for detecting hardware errors, comprising:
    running an algorithm on a hardware based processor, wherein the algorithm is designed to cause the hardware based processor to heat to a degree that increases the likelihood of hardware errors to manifest;
    generating a hardware error as a result of running the algorithm;
    generating an algorithm output for the algorithm, wherein the hardware error is observable in the algorithm output;
    comparing the algorithm output to another output for the algorithm; and
    detecting the hardware error from the comparison,
    wherein the algorithm comprises a non-linear memory access pattern, a Fourier transform, or a pseudospectral simulation of the Navier-Stokes equation.

12. The method of claim 11, wherein Navier-Stokes equation comprises time steps, and wherein the time steps are calculated using at least one of a Runge-Kutta scheme, an Adams-Bashforth scheme, or both.

13. The method of claim 11, wherein the hardware error alters a computation of the algorithm.

14. The method of claim 11, wherein running an algorithm on a hardware based processor includes propagating the hardware error during execution of the algorithm or magnifying the hardware error during execution of the algorithm.

15. The method of claim 11, wherein comparing the algorithm output to another output for the algorithm includes comparing the algorithm output to a predetermined value for the algorithm, wherein the other output for the algorithm is the predetermined value.

16. The method of claim 11, wherein the algorithm running on the hardware based processor is a first instance of the algorithm, and wherein comparing the algorithm output to another output for the algorithm includes comparing the algorithm output of the first instance of the algorithm to algorithm output of another instance of the algorithm.

17. The method of claim 11, further comprising optimizing the algorithm to increase the speed of the hardware based processor when the algorithm is run.

18. The method of claim 11, wherein the algorithm runs in parallel over a network.

19. The method of claim 11, wherein the algorithm loads another electronic component to run a portion of the algorithm on the electronic component to at least one of stress or heat the electronic component to a degree that increases the likelihood of hardware errors to manifest directly in that electronic component, and wherein the generated hardware error is observable in the algorithm output.

20. The method of claim 11, wherein the algorithm loads another electronic component to at least one of stress or heat the electronic component to a degree that increases the likelihood of hardware errors to manifest indirectly, and wherein the generated hardware error is observable in the algorithm output.

21. The method of claim 11, further comprising recommending a potential solution to the detected hardware error, choosing a resolution appropriate for a memory associated with the hardware based processor running the algorithm, or generating the algorithm designed to cause the hardware based processor to heat to a degree that increases the likelihood of hardware errors to manifest.

22. A method for detecting hardware errors, comprising:
running an algorithm on a hardware based processor, wherein the algorithm is designed to cause the hardware based processor to heat to a degree that increases the likelihood of hardware errors to manifest;
generating a hardware error as a result of running the algorithm;
generating an algorithm output for the algorithm, wherein the hardware error is observable in the algorithm output;
comparing the algorithm output to another output for the algorithm; and
detecting the hardware error from the comparison,
wherein the algorithm computes a solution to a mathematical problem.

23. The method of claim 22, wherein the mathematical problem is a fluid flow problem.

24. The method of claim 22, wherein the mathematical problem exhibits deterministic chaos.

25. The method of claim 22, wherein the mathematical problem requires high memory loads.

26. The method of claim 22, further comprising choosing at least one parameter for running the algorithm.

27. The method of claim 22, wherein the hardware error alters a computation of the algorithm.

28. The method of claim 22, wherein running an algorithm on a hardware based processor includes propagating the hardware error during execution of the algorithm or magnifying the hardware error during execution of the algorithm.

29. The method of claim 22, wherein comparing the algorithm output to another output for the algorithm includes comparing the algorithm output to a predetermined value for the algorithm, wherein the other output for the algorithm is the predetermined value.

30. The method of claim 22, wherein the algorithm running on the hardware based processor is a first instance of the algorithm, and wherein comparing the algorithm output to another output for the algorithm includes comparing the algorithm output of the first instance of the algorithm to algorithm output of another instance of the algorithm.

31. The method of claim 22, further comprising optimizing the algorithm to increase the speed of the hardware based processor when the algorithm is run.

32. The method of claim 22, wherein the algorithm runs in parallel over a network.

33. The method of claim 22, wherein the algorithm loads another electronic component to run a portion of the algorithm on the electronic component to at least one of stress or heat the electronic component to a degree that increases the likelihood of hardware errors to manifest directly in that electronic component, and wherein the generated hardware error is observable in the algorithm output.

34. The method of claim 22, wherein the algorithm loads another electronic component to at least one of stress or heat the electronic component to a degree that increases the likelihood of hardware errors to manifest indirectly, and wherein the generated hardware error is observable in the algorithm output.

35. The method of claim 22, further comprising recommending a potential solution to the detected hardware error, choosing a resolution appropriate for a memory associated with the hardware based processor running the algorithm, or generating the algorithm designed to cause the hardware based processor to heat to a degree that increases the likelihood of hardware errors to manifest.

* * * * *